Aug. 16, 1938.  L. A. CARPENTER ET AL  2,127,477
PHOTOELECTRIC GLOSS METER
Filed Dec. 16, 1935
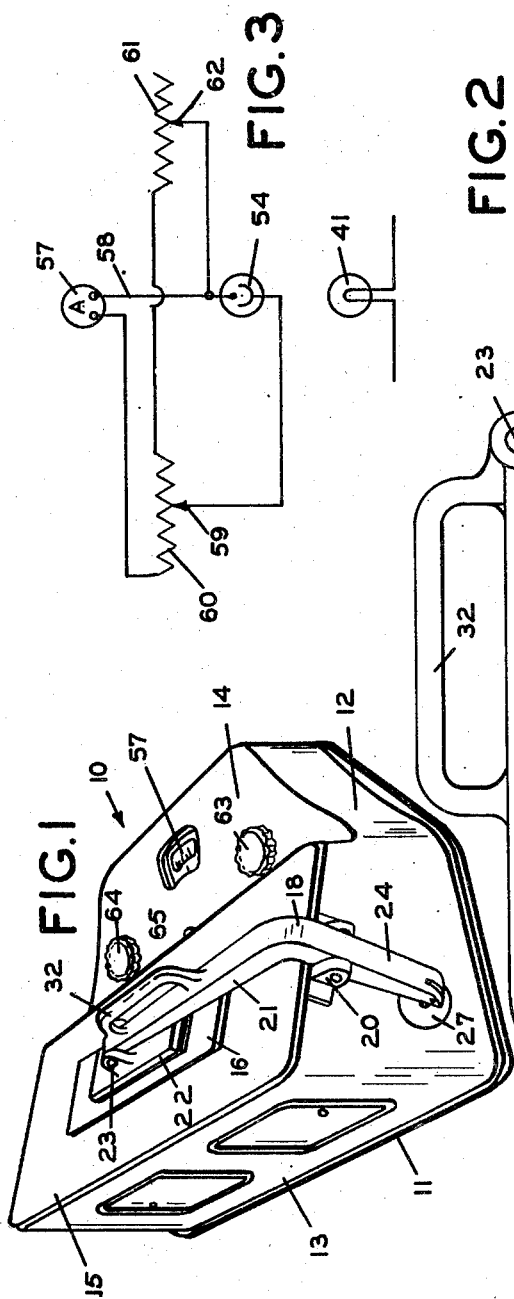
LYNNVILLE A. CARPENTER
ERNST J. SCHREINER
INVENTORS Patented Aug. 16, 1938

2,127,477

UNITED STATES PATENT OFFICE 2,127,477

PHOTOELECTRIC GLOSS METER

Lynnville A. Carpenter, Neenah, Wis., and Ernst J. Schreiner, Knoxville, Tenn., assignors to Oxford Paper Company, a corporation of Maine Application December 16, 1935, Serial No. 54,574

6 Claims. (Cl. 88—14)

The present invention relates to measuring devices and more particularly to a device for measuring the gloss on paper or the like.

In the manufacture of paper, one important property to be considered is the gloss, that is, the specular reflection from the surface of the paper. The amount of gloss is sometimes an indication of the quality of the paper and paper manufacturers therefore desire to establish and maintain standards by which paper can be readily classified according to its gloss.

One of the objects of the present invention is to provide a device for measuring gloss. Another object is to provide a gloss measuring device which is simple and rugged in construction yet efficient and accurate in operation. A further object is to provide a photoelectric gloss measuring device in which a sample is compared with a standard and the gloss of the sample indicated directly on a meter. These and other objects and advantages reside in certain novel features of construction, arrangement and combination of parts as will hereinafter be more fully set forth and pointed out in the appended claims.

Referring to the drawing:

Fig. 1 is a perspective view of an apparatus embodying this invention.

Fig. 2 is a vertical section thereof.

Fig. 3 is a wiring diagram of the apparatus.

A preferred embodiment of this invention is illustrated in the drawing wherein 10 indicates a housing having a base 11, side walls 12, a rear wall 13, a control panel 14 and a top platform 15. Mounted on the top of the platform 15 is an aperture plate 16 having an aperture 17. A bell crank lever 18 is pivoted at 19 on a bracket 20 secured to one wall 12 of the housing 10. One arm 21 of the lever 18 extends over the top of the platform 15 and a black glass plate 22 is pivoted at 23 on the arm 21 in such position that when the arm 21 is in its low position, the glass plate 22 closes the aperture 17 in the aperture plate 16. The other arm 24 of the lever 18 is pivotally connected at 25 to a rod 26 which is slidable in a cylinder 27 secured to the wall 12 of the housing 10. A spring 28 between the cylinder 27 and the arm 24 urges the lever 18 in a direction to press the glass plate 22 against the aperture plate 16 and a piston 29 on the rod 26 sliding in a bore 30 in the cylinder 27, is provided with a small air leak 31 to prevent too rapid movement of the glass plate 22 against the aperture plate 16. The glass plate 22 may be moved away from the aperture plate 16 by means of a handle 32 on the arm 21.

A bracket 33 is secured to the top platform 15 within the housing 10 and carries a tube 34 which is directed toward the aperture 17 at an angle which has been determined by experiment to be approximately 15 degrees. A ring 35 is slidably mounted on the outside of the tube 34 and carries a depending rod 36 on which an apertured plate 37 is slidable. The plate 37 can be fixed against sliding movement on the rod 36 by a set screw 38. A lamp socket 39 is secured in an aperture in the other end of the plate 37 by means of a set screw 40, and an electric lamp 41, mounted in the socket 39, extends into the tube 34 through an opening 42. A lens cell 43 is telescopically slidable in the front end of the tube 34 and carries a collimating lens 44 and a diaphragm 45 for directing a collimated beam of fixed size onto the aperture 17 from the lamp 41. When this lens 44 and diaphragm 45 have been focused, the cell 43 is fixed in position by a screw 46.

In operation, the lamp 41 is adjusted until a beam of the desired intensity and configuration is obtained. In order to facilitate the location of replacement lamps, a carrier 47 containing a lens 48 and a ground glass 49 is telescopically slidable in the rear end of the tube 34. After the lamp has been adjusted properly, the carrier 47 is moved along the tube until the lens 48 images the lamp 41 on the ground glass 49. The carrier 47 is then fixed in place by a screw 50 and the position of the lamp marked on the ground glass 49. Replacement lamps can then be readily positioned by simply moving them until the image formed by the lens 48 coincides with the marks on the ground glass 49. A window 51 is provided in the wall 12 to permit observation of the ground glass 49.

A second bracket 52 is secured to the top platform 15 within the housing 10 on the side of the aperture 17 opposite the bracket 33. A tube 53 is secured in the bracket 52 and directed toward the aperture 17 at the same angle as the tube 34. A photocell 54 is secured to the bracket 52 at the rear end of the tube 53 by means of a clamp 55 and screws 56.

Referring now to Fig. 3, the photocell 54 is shown as being of the photo-voltaic type and one side of this photocell is connected to one side of an ammeter 57 by a lead 58. The other side of the photocell 54 is connected to a sliding contact 59 which cooperates with a large resistance 60 connected to the other side of the ammeter 55

57 thus forming a potentiometer connection between the photocell and ammeter. A small resistance 61 is connected in series with the resistance 60 and a sliding contact 62 connected to the lead 58 cooperates with the resistance 61. In order to make coarse adjustments in the resistance between the photocell 54 and ammeter 57, the potentiometer contact 59 is moved and fine adjustments are obtained by moving the contact 62.

Extending through the control panel 14 are knobs 63 and 64 which move the contacts 59 and 62 respectively. The ammeter 57 is visible through an opening 65 in the control panel 14.

In operation, the light is directed against the black glass plate 22 and the knobs 63 and 64 adjusted until the ammeter reading is 100. While other standards of gloss could obviously be used, a black glass plate is preferred as the standard of 100 per cent gloss because it is almost entirely a first surface reflector since the light passing through the surface is absorbed. Without disturbing the setting of the knobs 63 and 64, the plate 22 is raised by the handle 32 and a sample inserted between the glass plate 22 and the aperture plate 16. The ammeter reading will then be the first surface reflection of the paper sample as compared with that of the glass plate 22. Since the reading for the plate 22 was set at 100, the reading for the paper sample will be the actual per cent gloss.

The aperture plate 16 is very slightly concaved inward so that any air trapped between the glass plate 22 and the paper sample can rapidly and freely escape. In this way the paper sample quickly flattens itself against the plate 22 while if the plate 22 fits tightly against the aperture plate 16, some time would elapse before the entrapped air would escape and a true reading could be taken.

From the foregoing it will be apparent that we are able to attain the objects of our invention and provide a simple and rugged apparatus for determining accurately the gloss of a sample such as paper. Various modifications can, of course, be made without departing from the spirit of our invention or the scope of the appended claims.

We claim:

1. In a device of the character described, a housing having an aperture, means within the housing for directing a beam of light toward said aperture at an angle of substantially 15 degrees thereto, a light responsive device within said housing located on the side of said aperture opposite said light source for receiving light from said aperture at an angle of substantially 15 degrees, a specular reflector, means for pressing said reflector against said housing at said aperture and means for introducing a sample between said reflector and said housing at said aperture.

2. In a device of the character described, a housing having an aperture, a lamp house within said housing at one side of said aperture, a lamp adjustably mounted in said lamp house, means in said lamp house for collimating the light from said lamp and for directing the collimated beam toward said aperture at an angle thereto, a photocell fixed within said housing on the side of said aperture opposite said lamp house and at the same angle as said beam, a black glass plate, means for adjustably mounting said plate on said housing so that the plate will contact the housing at said aperture and means for introducing a sample between said plate and said housing at said aperture.

3. In a device of the character described, a housing having an aperture, a lamp house within said housing at one side of said aperture, a lamp adjustably mounted in said lamp house, means in said lamp house for collimating the light from said lamp and for directing the collimated beam toward said aperture at an angle thereto, a photocell fixed within said housing on the side of said aperture opposite said lamp house and at the same angle as said beam, a black glass plate, means for adjustably mounting said plate on said housing so that the plate will contact the housing at said aperture, means for introducing a sample between said plate and said housing at said aperture and means for preventing the entrapment of air between said plate and said sample.

4. In a device of the character described, a housing having an aperture, means within said housing for directing a beam of light toward said aperture at an angle thereto, a light responsive device within said housing located on the side of said aperture opposite said light source and at the same angle to said aperture, a specular reflector, means for pressing said reflector against said housing at said aperture and means for introducing a sample between said reflector and said housing at said aperture.

5. In a device of the character described, a housing having an aperture, means within said housing for directing a beam of light toward said aperture at an angle thereto, a light responsive device within said housing located on the side of said aperture opposite said light source and at the same angle to said aperture, a specular reflector, means for pressing said reflector against said housing at said aperture, means for introducing a sample between said reflector and said housing at said aperture and means for permitting the escape of air entrapped between said reflector and said sample.

6. In a device of the character described a housing having a top wall, an aperture in said wall, said top wall being slightly concave adjacent said aperture, a light source within said housing, means for directing a collimated beam from said source toward said aperture at a small angle thereto, a photocell in said housing on the side of said aperture opposite said source and at the same angle as said beam, means for indicating the current from said photocell, a polished black glass plate, means for pressing said plate against said wall at said aperture and means for introducing a sample between said plate and said wall.

LYNNVILLE A. CARPENTER.
ERNST J. SCHREINER.